S. CLEMENS.
CULTIVATOR BLADE.
APPLICATION FILED FEB. 5, 1917.
1,280,164.
Patented Oct. 1, 1918.
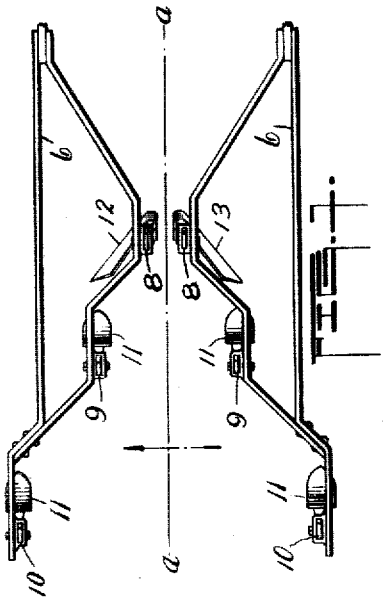
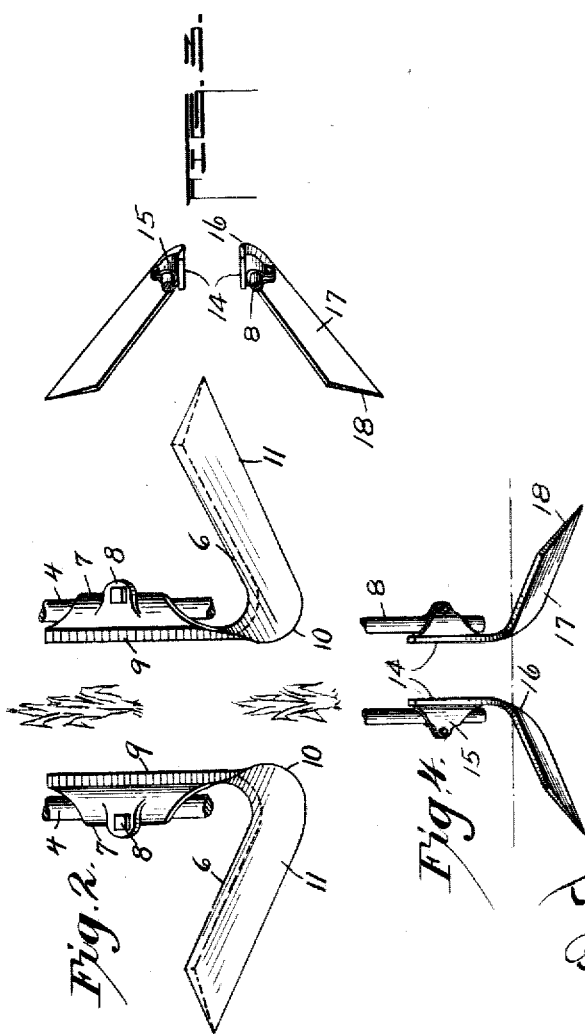
INVENTOR.
Samuel Clemens
By W. V. Tifft
ATT'Y

UNITED STATES PATENT OFFICE.

SAMUEL CLEMENS, OF HENNEPIN, ILLINOIS.

CULTIVATOR-BLADE.

1,280,164.  Specification of Letters Patent.  Patented Oct. 1, 1918.

Application filed February 5, 1917.  Serial No. 146,735.

*To all whom it may concern:*

Be it known that I, SAMUEL CLEMENS, a citizen of the United States, residing at Hennepin, in the county of Putnam and State of Illinois, have invented certain new and useful Improvements in Cultivator-Blades, of which the following is a specification.

This invention has reference more particularly to a cultivator blade to be used when the plant is too small to stand the ordinary methods of cultivation.

The object of the invention is to provide a cultivator blade which may be operated in close proximity to a small plant without danger of disturbing or injuring the plant.

Another object is to provide a cultivator blade which may be substituted for the shovels of the ordinary cultivator for breaking up the ground immediate adjacent the plant, at a time when it is too small to stand cultivation with the usual cultivating means.

Another object is to provide a cultivator blade with a portion at the inner terminal of the blade exposed above the ground during cultivation, whereby the cultivator blade may be guided in operation in close proximity to the plant.

Another object is the provision of a cultivator blade at each side of the corn row which has a cutting edge adjacent the corn row, which operates at a moderate depth and which has the blade thereof extending downwardly therefrom so as to operate at a greater depth at the outer end.

The invention also has other objects which will appear from the following specification and the accompanying drawings and which are pointed out in the claims.

Figure 1 is a top or plan view of a pair of ordinary cultivator supports to which the cultivating devices are attached.

Fig. 2 is a front elevation of the same.

Fig. 3 is a top view of a pair of cultivator blades with fragmentary portions of the cultivator spindles to which they are attached and.

Fig. 4 a rear view of the parts shown in Fig. 3.

These cultivator blades are designed to be used in connection with the ordinary type of cultivator and for the purpose of illustration I have shown, a cultivator support 1 mounted upon the axle 2 to which the wheels indicated diagrammatically at 3 are attached so that the cultivator may be drawn along the surface of the ground. Pivoted as at 4 to the support 1 in front of the wheels 3 is a bail 5 to the lower end of which the upturned front end member of the cultivator support 6 is secured by means of the adjusting clamp 7. There are two of these supports 6 as shown in Fig. 1 which are oppositely formed to have a series of corresponding cultivator standards 8, 9 and 10, the first pair of which indicated at 8 are positioned somewhat close together as shown in Fig. 1 so that the cultivators thereon will operate close to the corn row therebetween and the following pairs of standards 9 and 10 are each spaced farther apart so as to be spread out and operated upon a considerable width of ground.

The ordinary form of cultivator has a shovel shaped cultivating element 11 which is drawn through the ground and agitates the soil to a certain depth. These cultivator shovels, inasmuch as they present a flat surface in advancing through the ground, have a tendency, especially if the soil is somewhat hard, to disrupt the surface of the ground to a considerable extent at each side thereof and tear the earth up in clods and chunks. It is desirable to cultivate corn in the very early stages of its growth and if the ordinary cultivator shovels are employed, the pair adjoining the corn row tend, on account of the broad presented surface, to disrupt the soil to such an extent that it damages the corn plant.

For the purpose of enabling the operator to cultivate very closely to the corn row and, at the same time, prevent such disrupting of the ground which may be injurious to the corn, I have provided the cultivator blades 12 and 13 which are mounted on the forward standards 8 of the cultivator immediately adjoining the corn row. These cultivator blades are constructed in pairs; that is, there is a right hand blade and left hand blade. The blade has an upright shank 14 which projects substantially above the innermost cutting edge of the blade and serves as a guide to the operator in guiding the cultivator frames during operation. This shank has a clamp 15 thereon whereby the blade may be attached to the ordinary cultivator standards 8. At the lower end of the shank 14, the cultivator blade is bent in a somewhat gradual curve outwardly substantially as shown at 16 so that the blade 17 engages moderately at the base of the shank 14 and at a gradually increasing depth from the curved portion to its outer end. The forward edge of the blade and the lower portion of the shank 14 is sharpened so as to pass readily through the soil and the blade is swung rearwardly as shown in Fig. 3 so as to have a drawing effect in passing through the ground. The blade 17 is tilted transversely so that the rear edge of the blade is elevated somewhat above the forward cutting edge as shown in Fig. 4 so as to have a lifting effect upon the soil and the rear edge where it connects to the shank 14 is curved on a shorter radius than the forward cutting edge so as to cut and draw the earth laterally away from the corn row and upwardly. The outer end of the blade is cut at a rather sharp angle as at 18 so as to taper from the rear edge to a sharp point at the outer end of the forward cutting edge and facilitates passage of the cultivator blade through the ground.

This cultivator blade, because of its form and construction, not only can be operated very close to the corn row without damaging the plant but also scours very readily.

What I claim is:—

1. A cultivator blade comprising an integral body having an upstanding arm equipped on one side with a clamp for engagement with a cultivator shank, the lower end of the arm merging into a blade portion which is curved rearwardly and upwardly in an edgewise direction from said lower end of the arm, said blade portion also flaring outwardly from the transverse plane of the arm and being inclined transversely with its lower edge sharpened and advanced outwardly from the vertical plane of the upper edge, the said upper and lower edges of the blade constituting continuations of the rear and front edges of the said arm.

2. A cultivator blade comprising an elongated body having one end upturned and equipped on one side with a clamp for engagement with a cultivator shank, the body being curved edgewise intermediate its ends and the other end thereof extending rearwardly, upwardly, and outwardly and being inclined transversely with its lower edge offset outwardly from its upper edge and gradually merging throughout the curve into the forward edge of said upturned end, said lower edge being sharpened throughout the length of the rearwardly extending end and through the curve into the arm to provide an exposed cutting edge adjacent the plants when in use, the rear end of the body having its edge extending obliquely forward from the lower cutting edge to its upper edge.

In testimony whereof I affix my signature in presence of two witnesses.

SAMUEL CLEMENS.

Witnesses:
F. E. BRINCKERHOFF,
EARL VARNER.

Copies of this patent may be obtained for five cents each, by addressing the "Commissioner of Patents, Washington, D. C."